(12) United States Patent
Komaki

(10) Patent No.: US 6,920,094 B2
(45) Date of Patent: Jul. 19, 2005

(54) OPTICAL DISK DRIVE THAT SUPPORTS A PLURALITY OF RECORDING SPEEDS

(75) Inventor: Shigeru Komaki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 685 days.

(21) Appl. No.: 09/949,856

(22) Filed: Sep. 12, 2001

(65) Prior Publication Data

US 2002/0186630 A1 Dec. 12, 2002

(30) Foreign Application Priority Data

Jun. 8, 2001 (JP) ........................................ 2001-174425

(51) Int. Cl.$^7$ ................................................. G11B 5/09
(52) U.S. Cl. .................................. 369/47.33; 369/53.12
(58) Field of Search ........................... 369/47.28, 47.29, 369/47.3, 47.32, 47.33, 47.55, 53.12, 53.13, 53.34, 53.37

(56) References Cited

U.S. PATENT DOCUMENTS 5,363,361 A * 11/1994 Bakx ........................ 369/47.33
5,532,991 A * 7/1996 Sasaki ...................... 369/44.35

FOREIGN PATENT DOCUMENTS

| JP | 11-259982 | 9/1999 |
| JP | 2000-40302 | 2/2000 |
| JP | 2000-298924 | 10/2000 |
| JP | 2000-306334 | 11/2000 |
| JP | 2001-297439 | 10/2001 |
| JP | 2001-307327 | 11/2001 |

* cited by examiner

Primary Examiner—Paul W. Huber
(74) Attorney, Agent, or Firm—Pillsbury Winthrop Shaw Pittman, LLP

(57) ABSTRACT

A buffer underrun is generated intentionally, and the apparent recording speed is changed by alternately repeating start and stop of recording by using the buffer underrun free recording function to obtain a desired recording speed.

9 Claims, 6 Drawing Sheets

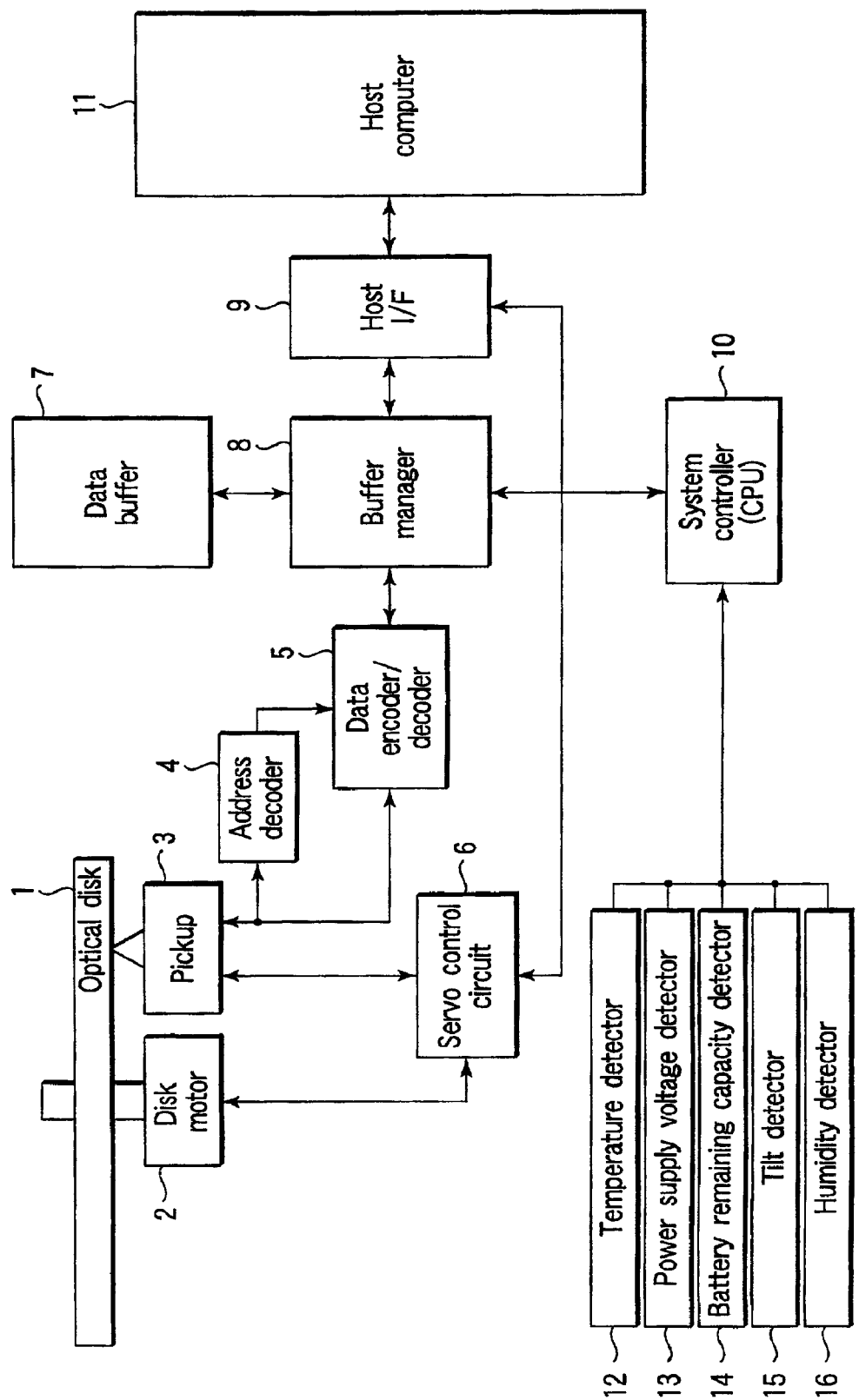
F I G. 1

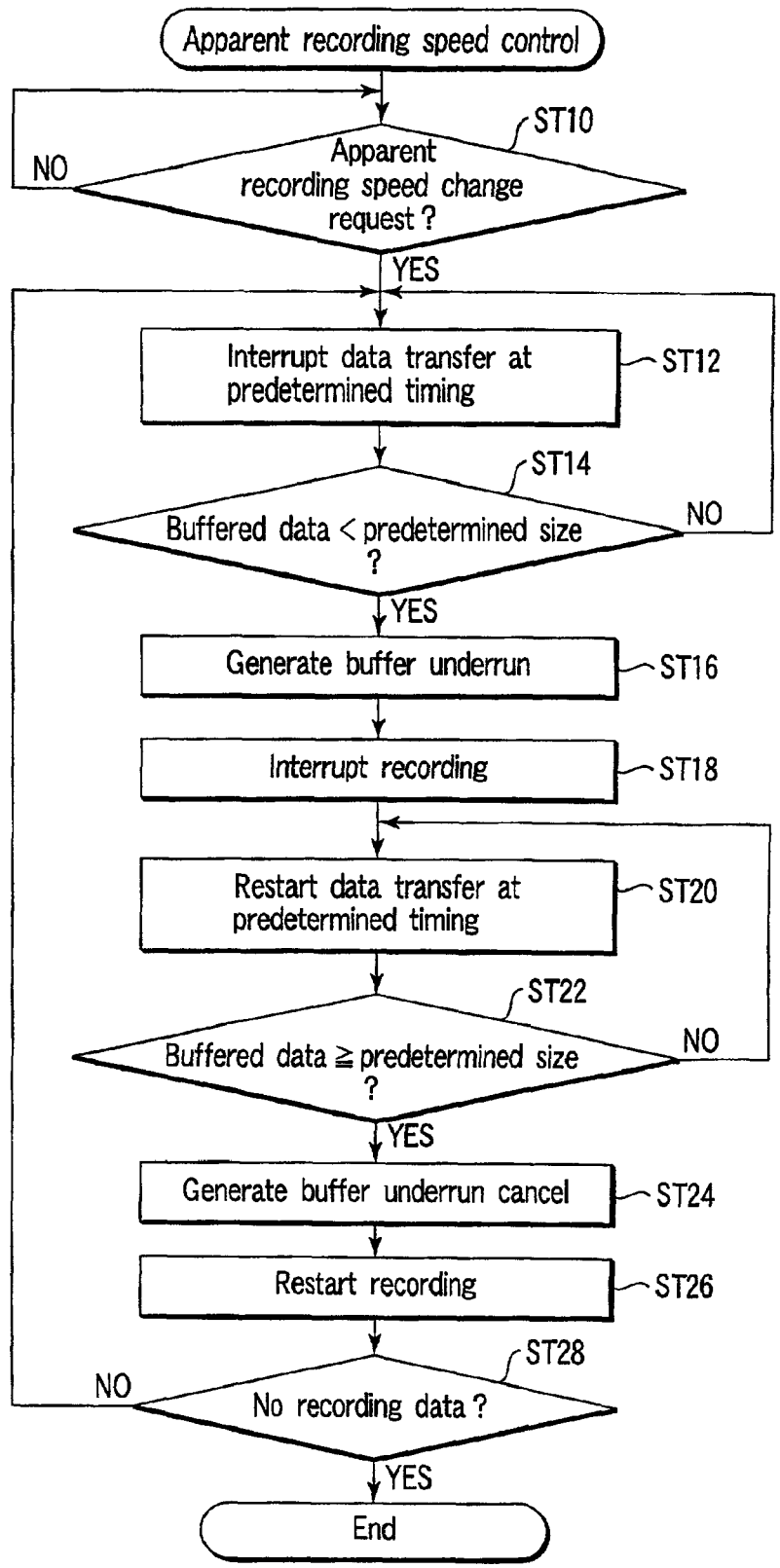
F I G. 3

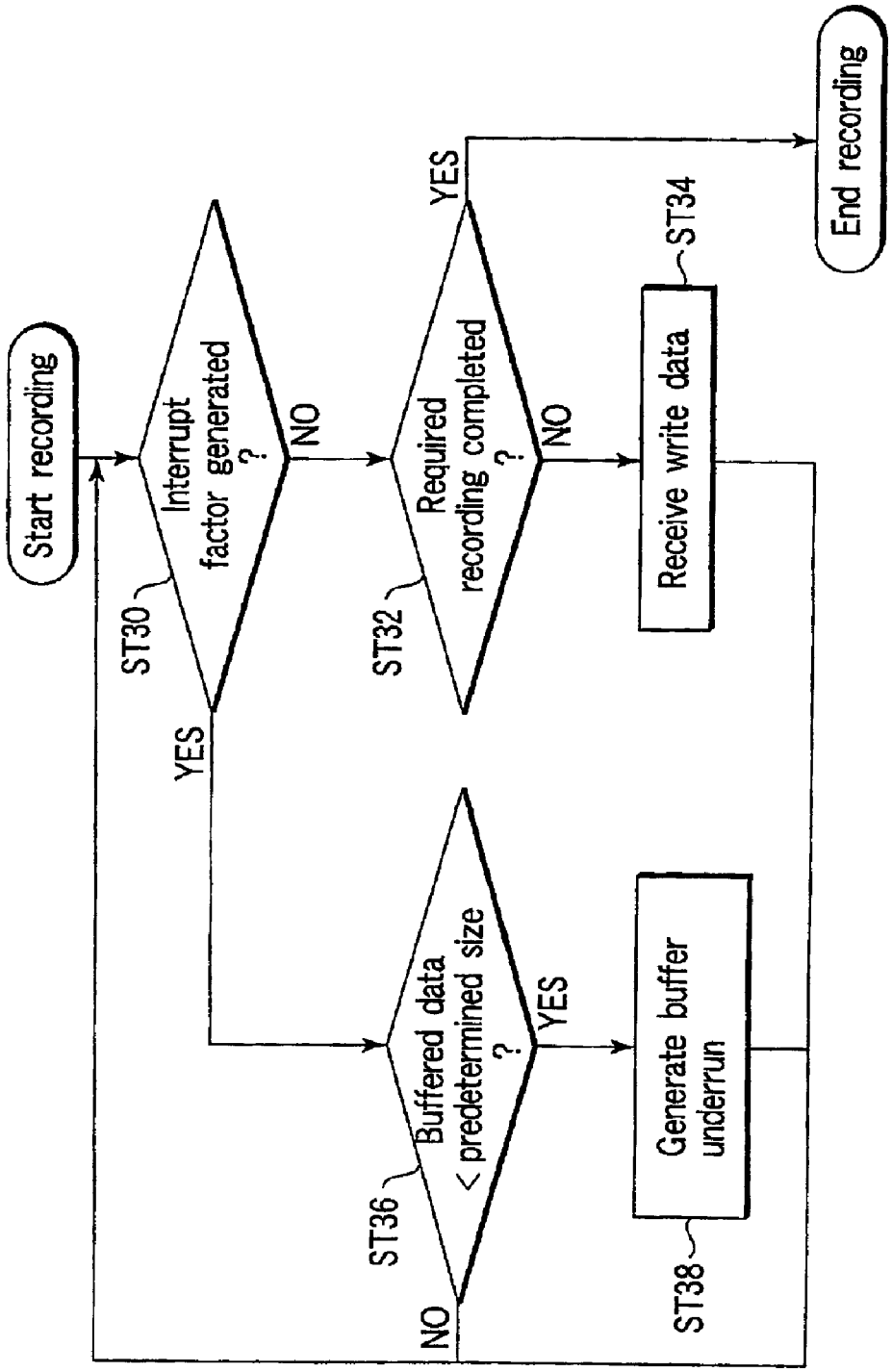
F I G. 4

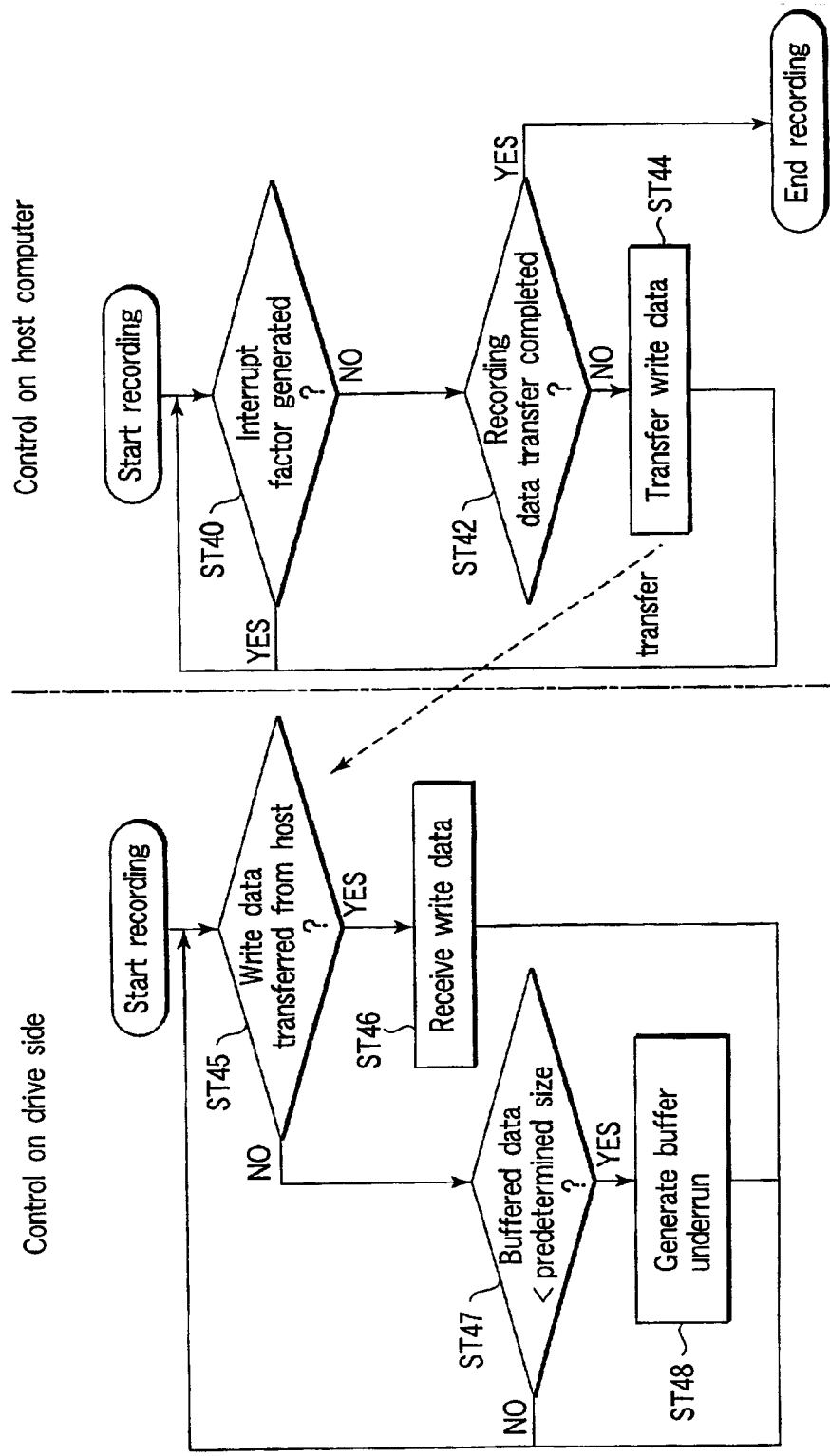
F I G. 5

OPTICAL DISK DRIVE THAT SUPPORTS A PLURALITY OF RECORDING SPEEDS

CROSS-REFERENCE TO RELATED APPLICATIONS

This application is based upon and claims the benefit of priority from the prior Japanese Patent Application No. 2001-174425, filed Jun. 8, 2001, the entire contents of which are incorporated herein by reference.

BACKGROUND OF THE INVENTION

1. Field of the Invention

The present invention relates to an optical disk drive for recording data on an optical disk. More specifically, the present invention relates to recording speed control in this optical disk drive, and measures to be taken upon generation of recording interrupt factors.

2. Description of the Related Art

In general, an optical disk device supports one or a plurality of recording speeds (double (×2)-speed, quadruple (×4)-speed, octuple (×8)-speed, and the like), and can record data at the supported recording speeds.

The optical disk device assumes various recording interrupt factors upon design, and can interrupt recording operation in correspondence with individual recording interrupt factors.

The number of types of recording speeds that the optical disk device can support is limited. In order to support more recording speeds, the cost of the optical disk device increases unwantedly. Likewise, in order to support more recording interrupt factors, control becomes complicated, resulting in high cost of the optical disk device.

The present invention has been made in consideration of the above situation, and has as its object to provide an optical disk device that can offer various supports without an increase in cost.

BRIEF SUMMARY OF THE INVENTION

In order to solve the above problems and to achieve the above object, an optical disk drive, recording speed control method, and recording control method of the present invention have the following arrangements.

(1) An optical disk drive of the present invention comprises rotation drive means for rotating an optical disk at a predetermined rotating speed, recording means for recording data at a predetermined recording speed on the optical disk rotated at the predetermined rotating speed, a buffer for buffering data to be recorded, monitor means for monitoring a size of data buffered on the buffer, buffer underrun generation means for generating a buffer underrun when the monitor means detects that the size of data buffered on the buffer becomes smaller than a predetermined size, recording interrupt control means for interrupting recording operation by the recording means in correspondence with generation of the buffer underrun, buffer underrun cancel generation means for generating a buffer underrun cancel when the monitor means detects that the size of data buffered on the buffer recovers to be not less than the predetermined size while the recording interrupt control means interrupts the recording operation, recording restart control means for restarting the interrupted the recording operation in correspondence with generation of the buffer underrun cancel so as to record data to be recorded after the buffer underrun cancel to be continuous with data recorded before generation of the buffer underrun, and recording control means for changing the apparent recording speed by alternately generating the buffer underrun and the buffer underrun cancel at predetermined timings.

(2) A recording speed control method of the present invention is a method of an optical disk drive that comprises rotation drive means for rotating an optical disk at a predetermined rotating speed, and recording means for recording data at a predetermined recording speed on the optical disk rotated at the predetermined rotating speed, comprising the steps of, generating a buffer underrun when it is detected that the size of data buffered on a buffer becomes smaller than a predetermined size, interrupting recording operation by the recording means in correspondence with generation of the buffer underrun, generating a buffer underrun cancel when it is detected that the size of data buffered on the buffer recovers to be not less than the predetermined size while the recording operation is interrupted in the interrupting step, restarting the interrupted the recording operation in correspondence with generation of the buffer underrun cancel so as to record data to be recorded after the buffer underrun cancel to be continuous with data recorded before generation of the buffer underrun, and the changing step of changing the apparent recording speed by alternately generating the buffer underrun and the buffer underrun cancel at predetermined timings.

(3) An optical disk drive of the present invention comprises a buffer for buffering data to be recorded, recording means for recording data buffered on the buffer on an optical disk, monitor means for monitoring a size of data buffered on the buffer, buffer underrun generation means for generating a buffer underrun when the monitor means detects that the size of data buffered on the buffer becomes smaller than a predetermined size, recording interrupt control means for interrupting recording operation by the recording means in correspondence with generation of the buffer underrun, buffer underrun cancel generation means for generating a buffer underrun cancel when the monitor means detects that the size of data buffered on the buffer recovers to be not less than the predetermined size while the recording interrupt control means interrupts the recording operation, recording restart control means for restarting the interrupted recording in correspondence with generation of the buffer underrun cancel so as to record data to be recorded after the buffer underrun cancel to be continuous with data recorded before generation of the buffer underrun, detection means for detecting generation and cancel of any recording interrupt factor, and substitution means for interrupting data transfer to the buffer when the detection means detects generation of any recording interrupt factor, and controlling the buffer underrun generation means to generate the buffer underrun so as to substitute generation of the recording interrupt factor for generation of the buffer underrun, and for restarting data transfer to the buffer when the detection means detects cancel of any recording interrupt factor, and controlling the buffer underrun cancel generation means to generate the buffer underrun cancel so as to substitute cancel of the recording interrupt factor for the buffer underrun cancel.

(4) A recording control method of the present invention is a method of an optical disk drive that comprises a buffer for buffering data to be recorded, recording means for recording data buffered on the buffer on an optical disk, monitor means for monitoring a size of data buffered on the buffer, buffer underrun generation means for generating a buffer underrun when the monitor means detects that the size of data buffered on the buffer becomes smaller than a predetermined size, recording interrupt control means for interrupting recording operation by the recording means in correspondence with generation of the buffer underrun, buffer underrun cancel generation means for generating a buffer underrun cancel when the monitor means detects that the size of data buffered on the buffer recovers to be not less than the predetermined size while the recording interrupt control means interrupts the recording operation, and recording restart control means for restarting the interrupted recording in correspondence with generation of the buffer underrun cancel so as to record data to be recorded after the buffer underrun cancel to be continuous with data recorded before generation of the buffer underrun, comprising the steps of, detecting generation and cancel of any recording interrupt factor, and interrupting data transfer to the buffer and controlling the buffer underrun generation means to generate the buffer underrun so as to substitute generation of the recording interrupt factor by generation of the buffer underrun, when generation of any recording interrupt factor is detected in the detecting step, and of restarting data transfer to the buffer and controlling the buffer underrun cancel generation means to generate the buffer underrun cancel so as to substitute cancel of the recording interrupt factor by the buffer underrun cancel, when cancel of any recording interrupt factor is detected in the detecting step.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a schematic block diagram of an optical disk device according to an embodiment of the present invention;

FIG. 3 is a flow chart for explaining a recording speed control method according to an embodiment of the present invention;

FIG. 4 is a flow chart for explaining a process for making a host computer intentionally generate a buffer underrun to take a measure against generation of a recording interrupt factor;

FIG. 5 is a flow chart for explaining a process for making a drive intentionally generate a buffer underrun to take a measure against generation of a recording interrupt factor.

DETAILED DESCRIPTION OF THE INVENTION

Figure 2:
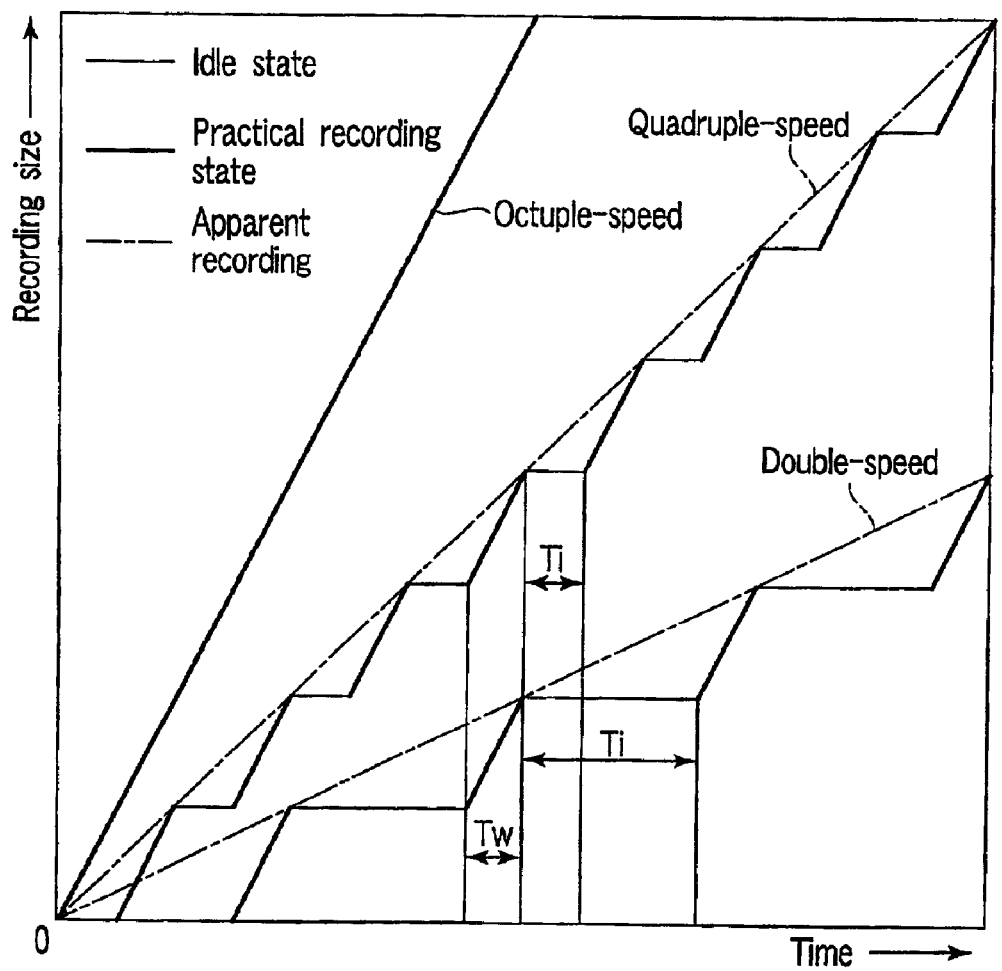
FIG. 2 is a graph showing an example of the relationship between an actual recording speed and apparent recording speed.

An embodiment of the present invention will be described hereinafter with reference to the accompanying drawings.

FIG. 1 is a schematic diagram of an optical disk device according to an embodiment of the present invention. This optical disk device records data on an optical disk 1 and reproduces data recorded thereon. As shown in FIG. 1, the optical disk device comprises a disk motor 2, pickup 3, address decoder 4, data encoder/decoder 5, servo control circuit 6, data buffer 7, buffer manager 8, host I/F 9, system controller (CPU) 10, temperature detector 12, power supply voltage detector 13, battery remaining capacity detector 14, tilt detector 15, and humidity detector 16.

The disk motor 2 rotates the optical disk 1 at a predetermined speed. Driving of the disk motor 2 is controlled by the servo control circuit 6. The pickup 3 irradiates the optical disk 1 with a recording light beam to record objective data on the optical disk 1. Furthermore, the pickup 3 irradiates the optical disk 1 with a reproduction light beam, and detects reflected light of this light beam. The light beam reflected by the optical disk 1 reflects data recorded on the optical disk 1, and data reflected in this reflected light, i.e., data recorded on the optical disk 1, can be reproduced on the basis of the detection result of the reflected light of the light beam. The address decoder 4 decodes address data contained in a signal reproduced from the optical disk. The decoded result is input to the data encoder/decoder 5. The data encoder/decoder 5 encodes data to be recorded on the optical disk, and decodes data reproduced from the optical disk. The servo control circuit 6 controls to drive the disk motor 2, as described above. Also, the servo control circuit 6 executes tracking control and focus control of the pickup 3. The data buffer 7 temporarily buffers data to be recorded sent from a host computer 11 via the host I/F 9. The buffer manager 8 manages the data buffer 7. For example, the buffer manager 8 monitors the size of data buffered on the data buffer 7. The host I/F 9 is used to exchange data between the optical disk device and host computer 11. The system controller 10 controls the entire optical disk device. The temperature detector 12 detects the temperature in the optical disk device. The power supply voltage detector 13 detects a voltage value of the power supply. The battery remaining capacity detector 14 detects the remaining capacity of a battery (not shown). The tilt detector 15 detects any tilt of the optical disk device. The humidity detector 16 detects the humidity in the optical disk device.

A buffer underrun free recording function provided to the aforementioned optical disk device will be explained below. This optical disk device buffers data to be recorded on the buffer 7, and sequentially records data buffered on the buffer 7. When the buffer that buffers data becomes empty during recording data on an optical disk such as a CD-R or the like (generation of a buffer underrun error), data cannot be additionally written on the optical disk, thus causing a recording error. The buffer underrun free recording function is provided to prevent such recording error.

In order to implement the buffer underrun free recording function, the buffer manager 8 always monitors the size of data buffered on the buffer 7. If it is detected that the size of data buffered on the buffer 7 has become smaller than a predetermined size, the buffer manager 8 generates a buffer underrun. Upon receiving the generated buffer underrun, the system controller 10 interrupts recording operation. When the buffer manager 8 detects that the size of data buffered on the buffer 7 has recovered to be equal to or larger than the predetermined size while recording operation is interrupted, the buffer underrun cancel is generated. Upon receiving the generated buffer underrun cancel, the system controller 10 restarts the interrupted recording operation so that data to be recorded after the buffer underrun is canceled continues to data recorded before generation of the buffer underrun.

An example of the operation for recording data so that data to be recorded after the buffer underrun is canceled continues to data recorded before generation of the buffer underrun will be described below.

Data to be recorded is processed in units of blocks in accordance with a predetermined recording format. The respective blocks are assigned addresses in turn. The blocks with the addresses are inserted between neighboring sync signals to generate a recording data signal. The generated recording data signal is recorded on an optical disk. When a buffer underrun is generated during recording of the recording data signal, recording operation is interrupted. When a buffer underrun cancel is generated while recording operation is interrupted, the end of the already recorded portion is detected. The address value of a block located at that end position is read out. The pickup is moved to the recorded position of a subtracted address value obtained by subtracting a predetermined value from the readout address value, i.e., the last address value. Reproduction starts from the moved position. With this reproduction, the already recorded block is reproduced. From each block, a sync signal (former half), address, data to be recorded, and sync signal (latter half) are reproduced in turn. When the address value obtained by reproduction matches the last address value, reproducting operation is switched to recording operation while the sync signal (latter half) is reproduced from the block which contains that address value. After switching, recording of the recording data signal restarts. In this way, data are recorded so that data recorded after the buffer underrun is canceled continues to data recorded before generation of the buffer underrun.

Since the optical disk device of the present invention comprises the buffer underrun free recording function, as described above, it can change an apparent recording speed by alternately generating a buffer underrun and buffer underrun cancel at predetermined operation timings. That is, by alternately executing recording operation and recording interrupting operation (idle state) at predetermined timings, an apparent recording speed can be changed.

The optical disk device normally supports one or a plurality of different recording speeds. In order to support more recording speeds in the optical disk device, the cost increases. Such increase in cost is caused since, for example, many pieces of information such as servo parameters and the like are required, a disk motor that supports a broad rotational speed range is expensive, servo control is complicated, and so forth. Hence, the optical disk device basically supports one or several different recording speeds, and effectively supports more recording speeds by changing the apparent recording speed, as described above. Exploiting a change in apparent recording speed, more recording speeds can be selected without requiring new hardware.

Let S1 be the apparent recording speed, S2 be the actual recording speed, Tw be the actual recording time, and Ti be the idle time (recording interrupted time). Then, S1 is given by:

$$S1=S2 \times Tw/(Tw+Ti)$$

FIG. 2 shows an example of the relationship between the actual recording speed and apparent recording speed. For example, assume that the actual recording speed is an octuple-speed (1200 bytes/sec). If the ratio of the actual recording time to the idle time is set at 1:1, the apparent recording speed S1 at that time is given by:

$$S1=S2 \times Tw/(Tw+Ti)=8 \times 1/(1+1)=4(\text{-fold speed})$$

If the ratio of the actual recording time to the idle time is set at 1:3, the apparent recording speed S1 at that time is given by:

$$S1=S2 \times Tw/(Tw+Ti)=8 \times 1/(1+3)=2(\text{-fold speed})$$

In this way, even when the optical disk device supports only the octuple recording speed, it can apparently record data using a plurality of recording speeds.

On the other hand, recorded data may be verified while recording operation is interrupted. That is, the pickup 3 may reproduce recorded data while recording operation is interrupted, and the data encoder/decoder 5 may confirm if data is normally recorded. This verification is done under the control of the system controller 10. In this way, the reliability of data to be recorded can be improved by using the recording operation interrupted time.

Apparent recording speed control will be summarized below with reference to the flow chart shown in FIG. 3. Assume that the optical disk device supports an n-fold recording speed. The system controller 10 in this optical disk device requests an apparent m-fold recording speed (ST10). Upon receiving this request, the buffer manager 8 stops buffering on the data buffer 7 at a predetermined timing on the basis of the relationship between the actual recording speed and apparent recording speed (ST12). If the size of data buffered on the data buffer 7 becomes smaller than a predetermined size upon stopping buffering (ST14, YES), a buffer underrun is generated (ST16). Upon generation of the buffer underrun, recording operation is interrupted (ST18). The buffer manager 8 restarts buffering on the data buffer 7 at a predetermined timing on the basis of the relationship between the actual recording speed and apparent recording speed (ST20). If the size of data buffered on the data buffer 7 becomes equal to or larger than the predetermined size upon restarting buffering (ST22, YES), a buffer underrun cancel is generated (ST24). Upon generation of the buffer underrun cancel, recording operation restarts (ST26). If data to be recorded still remain (ST28, NO), the aforementioned processes in steps ST10 to ST26 are repeated. If no data to be recorded remains (ST28, YES), the processing ends.

The predetermined timings will be complementarily explained below. The apparent recording speed is controlled by stopping and restarting buffering at predetermined timings, as described above. In this case, recording of very small data and interruption equivalent to that recording time are not alternately repeated, but recording of data for 100 blocks and interruption equivalent to that recording time are alternately repeated. The buffering stop and restart timings to repeat such recording and interruption are the predetermined timings. Note that one block is comprised of, e.g., 16 sectors, and one sector contains user data of, e.g., 2048 bytes.

Recording interrupt control using the aforementioned buffer underrun free recording function will be explained below.

When a recording interrupt factor has been generated while the optical disk device records data on an optical disk, a recording error may occur. The recording interrupt factors include, e.g., an abnormal internal temperature of the optical disk device, an abnormal power supply voltage supplied to the optical disk device, an insufficient remaining capacity of a battery mounted in the optical disk device, an allowable tilt angle error of the optical disk device, too high a humidity in the optical disk device, and the like.

For example, when the optical disk device is built in a personal computer, the internal temperature of the personal computer rises as the personal computer is used. Under the influence of the temperature rise, the internal temperature of the optical disk device often becomes abnormally high. When the internal temperature value has exceeded the limit value of the guaranteed operating temperature range, a recording error occurs. Recording operation must be interrupted before such recording error occurs. When the internal temperature value that has exceeded the limit value of the guaranteed operating temperature range once falls within the guaranteed operating temperature range, recording operation must be restarted. In addition, data recorded after recording operation restarts must continue to data recorded before recording operation was interrupted. Various recording interrupt factors are known, as described above. Recording operation must be interrupted and restarted in correspondence with all these factors.

To this end, the present invention exploits the aforementioned buffer underrun free recording function. That is, upon generation of a recording interrupt factor, transfer of data to be buffered on the data buffer is interrupted to intentionally generate a buffer underrun. That is, generation of a recording interrupt factor is substituted by that of a buffer underrun. Upon canceling the recording interrupt factor, transfer of data to be buffered on the data buffer restarts to intentionally generate a buffer underrun cancel. That is, cancel of a recording interrupt factor is substituted by that of a buffer underrun. This substitution is implemented by the system controller 10 and buffer manager 8 that detect generation and cancel of an interrupt factor.

The system controller 10 monitors the temperature value inside the optical disk device output from the temperature detector 12 to detect both generation and cancel of an abnormal temperature. The system controller 10 also monitors the power supply voltage value output from the power supply voltage detector 13 to detect both generation of an abnormal voltage value and return to a normal voltage value. Furthermore, the system controller 10 monitors the remaining capacity of a battery output from the battery remaining capacity detector 14 to detect an insufficient remaining capacity of the battery, and recovery from the insufficient remaining capacity of the battery. Moreover, the system controller 10 monitors the tilt value of the optical disk device output from the tilt detector 15 to detect if the tilt angle exceeds the allowable tilt angle range. In addition, the system controller 10 monitors the humidity value inside the optical disk device output from the humidity detector 16 to detect if the humidity value exceeds the allowable humidity value range.

As described above, means for detecting any recording interrupt factors may be provided to the drive side (optical disk device), or may be provided to the host computer side. When the host computer comprises means for detecting any recording interrupt factors, if an existing buffer underrun free drive is available, measures against generation of interrupt factors can be taken by changing the program of the host computer. Especially, since a recent portable personal computer has a temperature sensor and battery remaining capacity sensor, hardware need not be changed in some cases. When the drive comprises means for detecting any recording interrupt factors, measures against generation of interrupt factors can be taken without changing the system LSI. That is, since generation of various recording interrupt factors is substituted by that of a buffer underrun, measures against generation of interrupt factors can be taken without changing hardware or by changing hardware slightly.

A process for making the host computer intentionally generate a buffer underrun to take a measure against generation of a recording interrupt factor will be explained below with reference to the flow chart shown in FIG. 4. If generation of any recording interrupt factor is not detected (ST30, NO), write data is kept received (ST34) until required recording is completed (ST32, NO). If generation of any recording interrupt factor is detected (ST30, YES), write data is no longer received, the size of data buffered on the buffer becomes smaller than the predetermined size (ST36, YES), and a buffer underrun process starts (ST38).

A process for making the drive intentionally generate a buffer underrun to take a measure against generation of a recording interrupt factor will be explained below with reference to the flow chart shown in FIG. 5. If generation of any recording interrupt factor is not detected on the host computer side (ST40, NO), write data transfer continues (ST44) until transfer of recording data is completed (ST42, NO). If generation of any recording interrupt factor is detected (ST40, YES), write data is no longer transferred.

On the drive side, if write data is transferred from the host computer (ST45, YES), this write data is received (ST46), and recording operation normally progresses. If transfer of write data from the host computer is stopped (ST45, NO), the size of data buffered on the buffer becomes smaller than the predetermined size (ST47, YES), and a buffer underrun process starts (ST48).

Figure 6:
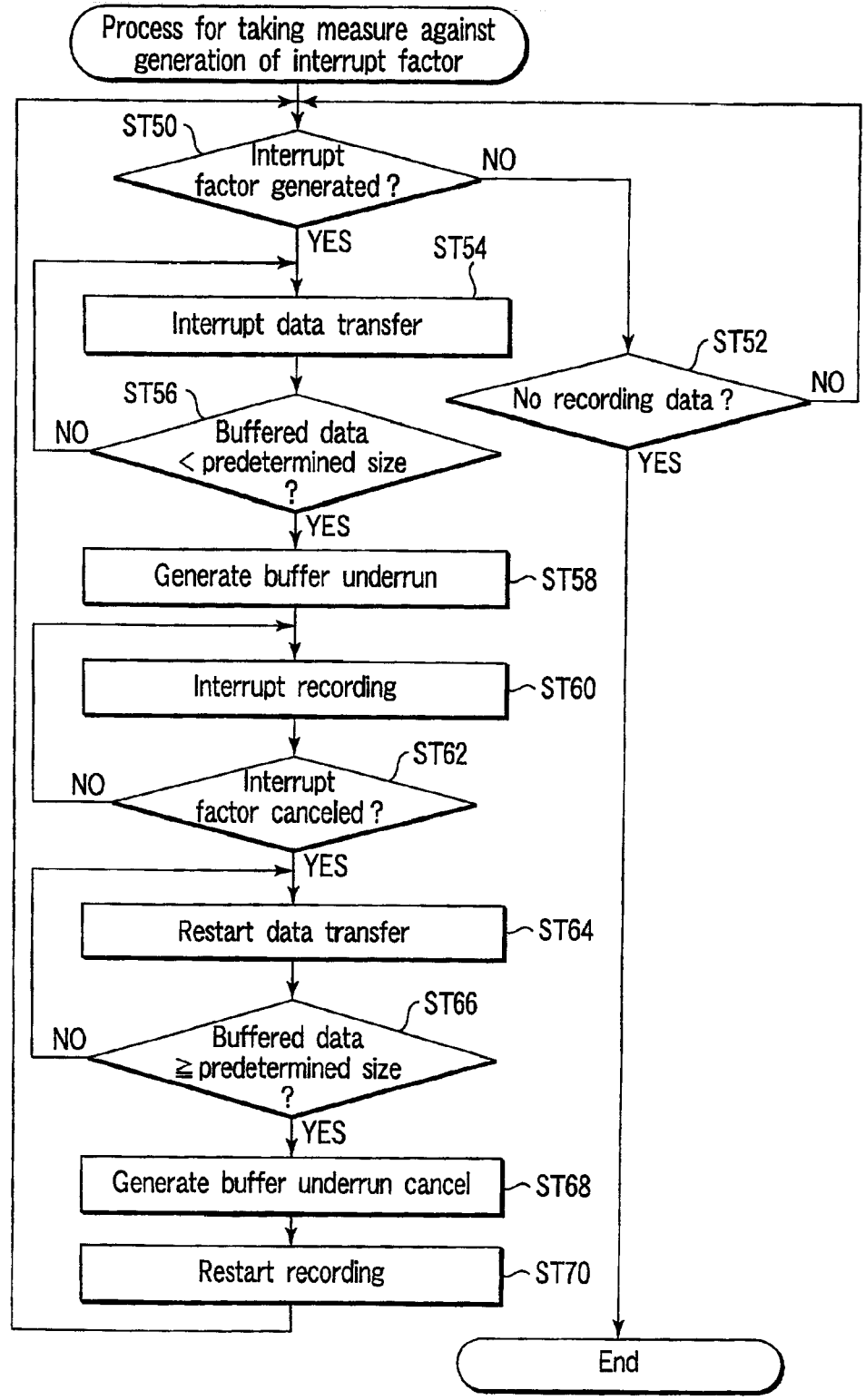
FIG. 6 is a flow chart that summarizes a recording control method that can take measures against generation of recording interrupt factors.

A process for taking a measure against an interrupt factor will be summarized below with reference to the flow chart shown in FIG. 6. If a recording interrupt factor is not generated (ST50, NO), normal recording operation continues until all data to be recorded are recorded (ST52, YES). If a recording interrupt factor is generated (ST50, YES), buffering on the data buffer 7 is stopped (ST54). If the size of data buffered on the data buffer 7 becomes smaller than the predetermined size upon stopping buffering (ST56, YES), a buffer underrun is generated (ST58). Upon generation of the buffer underrun, recording operation is interrupted (ST60).

If the recording interrupt factor is canceled (ST62, YES), buffering on the data buffer 7 restarts (ST64). If the size of data buffered on the data buffer 7 becomes equal to or larger than the predetermined size upon restarting buffering (ST66, YES), a buffer underrun cancel is generated (ST68). Upon generation of the buffer underrun cancel, recording operation restarts (ST70).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disk drive comprising:

rotation drive means for rotating an optical disk at a predetermined rotating speed;

recording means for recording data at a predetermined recording speed on the optical disk rotated at the predetermined rotating speed;

recording control means for changing an apparent recording speed by controlling start and stop of recording operation by said recording means without changing the predetermined recording speed;

a buffer for buffering data to be recorded;

monitor means for monitoring a size of data buffered on maid buffer;

buffet underrun generation means for generating a buffer underrun when said monitor means detects that die size of data buffered on said buffer becomes smaller than a predetermined size;

recording interrupt control means for interrupting said recording operation by said recording means in correspondence with generation of the buffer underrun;

buffer underrun cancel generation means for generating a buffer underrun cancel when said monitor means detects that die size of data buffered on said buffer recovers to be not less than the predetermined size while said recording interrupt control means interrupts said recording operation; and recording restart control means for restarting the interrupted said recording operation in correspondence with generation of the buffer underrun cancel so as to record data to be recorded after the buffer underrun cancel to be continuous with data recorded before generation of the buffer underrun, and wherein said recording control means changes the apparent recording speed to $1/(1+n)$ the predetermined recording speed by controlling a ratio of an actual data recording time and interrupting rime of said recording option to $1:n$ by alternately generating the buffer underrun and the buffer underrun cancel at predetermined timings.

2. An optical disk drive according to claim 1, further comprising:

verify means for verifying recorded data while said recording interrupt control means interrupts said recording operation.

3. A recording speed control method of an optical disk drive that comprises rotation drive means for rotating an optical disk at a predetermined rotating speed, and recording means for recording data at a predetermined recording speed on the optical disk rotated at the predetermined rotating speed, comprising the steps of:

changing an apparent recording speed by controlling start and stop of recording operation by said recording means;

generating a buffer underrun when it is detected that the size of data buffered on a buffer becomes smaller than a predetermined size;

interrupting said recording operation by said recording means in correspondence with generation of the buffer underrun;

generating a buffer underrun cancel when it is detected that the size of data buffered on the buffer recovers to be not less than the predetermined size while said recording operation is interrupted in the interrupting step; and restarting the interrupted said recording operation in correspondence with generation of the buffer underrun cancel so as to record data to be recorded after the buffer underrun cancel to be continuous with data recorded before generation of the buffer underrun, and wherein the changing step includes the step of changing the apparent recording speed to $1/(1+n)$ the predetermined recording speed by controlling a ratio of an actual data recording time and interrupting time of said recording operation to $1:n$ by alternately generating the buffer underrun and the buffer underrun cancel at predetermined timings.

4. A recording speed control method according to claim 3, further comprising the verify step of verifying recorded data while said recording operation is interrupted in the interrupting step.

5. An optical disk drive comprising:

a buffer for buffering data to be recorded;

recording means for recording data buffered on said buffer on an optical disk;

detection means for detecting generation and cancel of any recording interrupt factor; and buffer underrun control means for interrupting data transfer to said buffer to generate a buffer underrun when said detection means detects generation of any recording interrupt factor, and for restarting data transfer to said buffer to cancel the buffer underrun when said detection means detects cancel of any recording interrupt factor.

6. An optical disk drive according to claim 5, wherein said detection means includes abnormal temperature detection means for detecting any abnormal temperature.

7. An optical disk drive according to claim 5, wherein said detection means includes abnormal electric power detection means for detecting any abnormal drive electric power.

8. An optical disk drive comprising:

a buffer for buffering data to be recorded;

recording means for recording data buffered on said buffer on an optical disk;

monitor means for monitoring a size of data buffered on said buffer;

buffer underrun generation means for generating a buffer underrun when said monitor means detects that the size of data buffered on said buffer becomes smaller than a predetermined size;

recording interrupt control means for interrupting recording operation by said recording means in correspondence with generation of the buffer underrun;

buffer underrun cancel generation means for generating a buffer underrun cancel when said monitor means detects that the size of data buffered on said buffer recovers to be not less than the predetermined size while said recording interrupt control means interrupts said recording operation;

recording restart control means for restarting the interrupted said recording operation in correspondence with generation of the buffer underrun cancel so as to record data to be recorded after the buffer underrun cancel to be continuous with data recorded before generation of the buffer underrun;

detection means for detecting generation and cancel of any recording interrupt factor; and substitution means for interrupting data transfer to said buffer when said detection means detects generation of any recording interrupt factor, and controlling said buffer underrun generation means to generate the buffer underrun so as to substitute generation of the recording interrupt factor for generation of the buffer underrun, and for restarting data transfer to said buffer when said detection means detects cancel of any recording interrupt factor, and controlling said buffer underrun cancel generation means to generate the buffer underrun cancel so as to substitute cancel of the recording interrupt factor for the buffer underrun cancel.

9. A recording control method of an optical disk drive, said optical disk device comprising:

a buffer for buffering data to be recorded; and recording means for recording data buffered on said buffer on an optical disk, said recording control method comprising the steps of:

detecting generation and cancel of any recording interrupt factor; and interrupting data transfer to said buffer to generate a buffer underrun when generation of any recording interrupt factor is detected in the detecting step, and restarting data transfer to said buffer to cancel the buffer underrun when cancel of any recording interrupt factor is detected in the detecting step.

* * * * *